Sept. 30, 1924.
P. M. HALL
WELDING AND FORGING DIE
Filed April 30, 1923
1,510,078
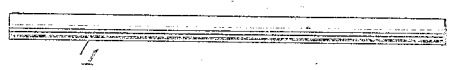
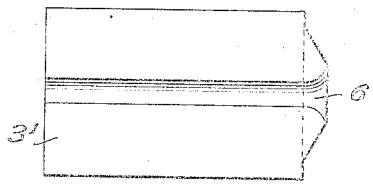
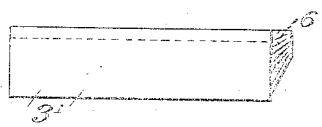
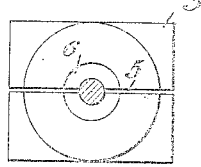
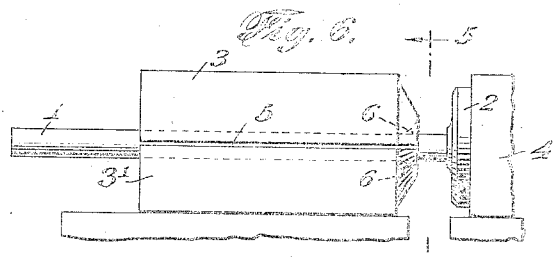
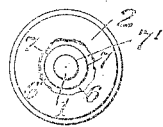
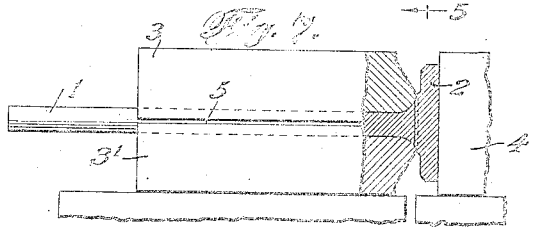
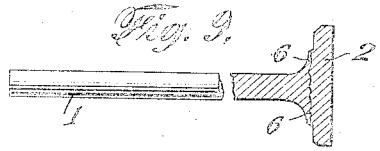
INVENTOR
Preston M. Hall
BY
Townsend & Decker
ATTORNEYS Patented Sept. 30, 1924.

1,510,078

UNITED STATES PATENT OFFICE.

PRESTON M. HALL, OF SWAMPSCOTT, MASSACHUSETTS, ASSIGNOR TO THOMSON ELECTRIC WELDER COMPANY, OF BOSTON, MASSACHUSETTS, A CORPORATION OF MASSACHUSETTS.

WELDING AND FORGING DIE.

Original application filed January 20, 1922. Divided and this application filed April 30, 1923.
Serial No. 635.465.

*To all whom it may concern:*

Be it known that I, PRESTON M. HALL, a citizen of the United States, and a resident of Swampscott, in the county of Essex and State of Massachusetts, have invented certain new and useful Improvements in Welding and Forging Dies, of which the following is a specification.

My invention relates to an electrical welding or forging die set forth in my application for patent filed January 20th, 1922, Serial No. 530,525, as a preferred means for carrying out the process and producing the article described and claimed in that application.

In said prior application, of which the present constitutes a division, I have set forth the improved method of producing composite metal work comprising a headed rod, the head and stem united by an electrical welding and forging process whereby a weld is produced having in the aggregate an enlarged cross-sectional area greater than the cross-sectional area of the stem itself back of the weld.

My present invention consists in the construction of the welding and forging die so formed that it will trim away the excess metal thrown out by the pressure of the welding and forming die, leaving the formed part in substantially its final shape and permitting the excess metal to be readily removed, all as more particularly hereinafter described.

In the accompanying drawings:

Fig. 1 shows a rod, the end of which is to be united, by the use of the welding and forging die, to a head such as shown in Fig. 2, to form a headed rod.

Fig. 3 is a plan of one-half of my improved forging and welding tool or die and

Fig. 4 is a side elevation thereof.

Fig. 5 is an end view of the die or holder.

Fig. 6 shows the work assembled between the welding dies or holders for the welding and forging operation described and claimed in my prior application.

Fig. 7 shows the operation completed.

Fig. 8 is a top or end view of the headed rod such as a poppet valve made by the use of the tool when employed in the operation.

Fig. 9 is a central, longitudinal section through the headed rod to illustrate the nature of the union.

1 is the rod such as a valve rod and 2 the head to which it is to be united. The forging and welding die for holding the rod is preferably a split die or holder the two parts of which are indicated at 3—3'. Suitable means, not shown, for clamping the rod between the two parts are provided. The opposite current and pressure die used in connection with my improved die in carrying out the process to produce a headed rod is indicated at 4. The rod is preferably received in a cylindrical passage in the two halves of the holder 3—3' formed by semi-cylindrical grooves in their meeting faces. The line or split of the tool is indicated at 5.

In the working end or face of the die or holder is a forging or shaping cavity indicated at 6 through the bottom of which the rod projects beyond the end of the die for engagement with the piece 2. The end of the die is tapered or cut away back from the mouth of the forging or shaping cavity 6, as shown, thus forming a separating or dividing edge for a purpose to be presently described. The surface of the head or piece 2 may be provided with a protuberance or projection against which the end of the rod 1 may be abutted, said projection being preferably of somewhat less circumference or width than the maximum width of the forging cavity and slightly greater than the width or diameter of the rod 1 as presented and engaged against said projection.

The parts being arranged as shown in Fig. 6 and current and pressure applied in the manner usually employed for practicing welding by the electrical resistance method, the current is allowed to flow in amount and under a pressure sufficient to heat the projecting end of the stem very quickly, up to proper welding and forging temperature. When this temperature is reached, the holder 3 or the die 4, or the platen supporting the same, either or both, move up towards one another, thus causing the projected portion of the rod to expand or bulge laterally while at the same time the full diameter of the rod is welded to the part 2 and the cup-shaped die acts to forge and shape the laterally projected or expanded, heated metal and to press it, with a welding pressure, against the portion of the piece 2 around the portion of the surface initially engaged by the rod thus welding said expanded metal to the piece 2.

The effect of this welding and forging action produced by the die with its cup-shaped or forging and shaping mouth is to produce a welded joint such as is illustrated in Figs. 8 and 9. In this operation the metal that expands laterally is confined by the cup and the extent of its expansion limited thereby. Owing to the form of the die it not only forms, confines, shapes and welds the laterally expanded metal but it also trims or separates the surplus metal thrown out from the welded area owing to the fact that its working end is tapered back or cut back from around the edge of the cut or depression and said surplus metal may be thereafter readily removed. Furthermore the shape is important because at the finish of the weld the pressure is exerted wholly on the metal confined within the cavity of the die and none is dissipated in squeezing the excess bur as it would be if the end of the die around the edge of the cavity were left flat-faced so that the excess metal would be squeezed in between said flat face and the face of the valve head 2.

The effect of forging a large volume of hot metal into the die and at the same time around the projection on the piece 2 is to prevent too rapid cooling which is the cause of the extreme brittleness of the weld made by the usual methods. As soon as, under the pressure and temperatures suitable for welding, the welding is finished, the current is cut off by means of an automatic switch or otherwise, the cut-off taking place just before or at the time or just after the parts reach the position shown in Fig. 7 which shows the completion of the operation.

In the finished union the area between the points 6, 6, Figs. 8 and 9, is all welded area, that outside of these points or lines being burs or upset metal squeezed out of the forging head and separated or divided therefrom by the edge of the forging face of the die which portion, thus divided off, may be readily removed. It will be seen also that the die could be made to forge the metal around the projection on the part 2 as well as against the surface surrounding the same when the projection and the cup in the die are properly proportioned.

The portion of the work included between the circular lines 7, 7, Fig. 8, will exhibit a finished appearance owing to the shaping action of the forging die and practically all the metal included between said lines on the face of the part 2 will be welded metal, thereby giving an area of weld much greater than would be afforded if the end only of the rod, the area of which is that included in the circular line 7′, were welded.

What I claim as my invention is:—

1. An electrical welding and forging die tapered or cut back from the edge of the forging cavity and forming a trimming edge for trimming away excess metal around the forged part of the work as and for the purpose described.

2. An electrical welding and forging die having a passageway for clamping the metal terminating in a forging cavity on its working face and split through said passageway and cavity, the end of the die being tapered to form a trimming edge around the edge of the forging cavity for trimming away the excess metal of the work as and for the purpose described.

3. A welding clamp having its side opposite the place of welding formed into a shaping or forging die and cut away from the edge of the forging cavity to form a trimming edge at the edge of the forging cavity as and for the purpose described.

Signed at Lynn, in the county of Essex and State of Mass., this 23rd day of April A. D. 1923.

PRESTON M. HALL.

Witnesses:
ALBR. P. REED,
WOLCOTT REMINGTON.

Certificate of Correction.

It is hereby certified that the assignment in Letters Patent No. 1,510,078, granted September 30, 1924, upon the application of Preston M. Hall, of Swampscott, Massachusetts, for an improvement in "Welding and Forging Dies," was erroneously described and specified as "Thomson Electric Welder Company," whereas said assignee should have been described and specified as *Thomson Electric Welding Company*, as shown by the records of assignments in this office; and that the said Letters Patent should be read with this correction therein that the same may conform to the record of the case in the Patent Office.

Signed and sealed this 11th day of November, A. D. 1924.

[SEAL.]

KARL FENNING,
*Acting Commissioner of Patents.*